(12) United States Patent
Park et al.

(10) Patent No.: US 10,624,045 B2
(45) Date of Patent: *Apr. 14, 2020

(54) METHOD AND APPARATUS FOR PERFORMING POWER HEADROOM REPORTING PROCEDURE IN WIRELESS COMMUNICATION SYSTEM

(71) Applicant: LG ELECTRONICS INC., Seoul (KR)

(72) Inventors: Sung Jun Park, Anyang-si (KR); Sun Young Lee, Anyang-si (KR); Sung Hoon Jung, Anyang-si (KR); Young Dae Lee, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/249,605

(22) Filed: Jan. 16, 2019

(65) Prior Publication Data

US 2019/0150104 A1 May 16, 2019

Related U.S. Application Data

(63) Continuation of application No. 15/641,637, filed on Jul. 5, 2017, now Pat. No. 10,206,183, which is a
(Continued)

(51) Int. Cl.
*H04W 52/36* (2009.01)
*H04W 52/04* (2009.01)
(Continued)

(52) U.S. Cl.
CPC ......... *H04W 52/365* (2013.01); *H04W 52/04* (2013.01); *H04W 72/04* (2013.01); *H04W 72/0473* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 2001/0046878 | A1 | 11/2001 | Chang |
| 2004/0147276 | A1 | 7/2004 | Gholmieh et al. |

(Continued)

FOREIGN PATENT DOCUMENTS

| | | |
|---|---|---|
| CN | 101932087 A | 12/2010 |
| CN | 102067480 A | 5/2011 |

(Continued)

OTHER PUBLICATIONS

3GPP TS 36.321 V11.2.0, "3rd Generation Partnership Project; Technical Specification Group Radio Access Network; Evolved Universal Terrestrial Radio Access (E-UTRA); Medium Access Control (MAC) protocol specification (Release 11)", Mar. 2013, pp. 1-56.

(Continued)

*Primary Examiner* — Rebecca E Song
(74) *Attorney, Agent, or Firm* — Fish & Richardson P.C.

(57) ABSTRACT

A method performed by a user equipment (UE) in a wireless communication system, includes triggering a first power headroom report (PHR), wherein a first PHR media access control (MAC) control element (CE) is not transmitted when first uplink (UL) resources cannot accommodate the first PHR MAC CE plus its subheader, triggering a second PHR, determining whether at least one PHR has been triggered and not cancelled and transmitting a second PHR MAC CE when it is determined that the at least one PHR has been triggered and not cancelled, and when second UL resources can accommodate the second PHR MAC CE plus its subheader.

18 Claims, 15 Drawing Sheets

Related U.S. Application Data continuation of application No. 15/180,747, filed on Jun. 13, 2016, now Pat. No. 9,723,577, which is a continuation of application No. 13/890,827, filed on May 9, 2013, now Pat. No. 9,392,554.

(60) Provisional application No. 61/677,451, filed on Jul. 30, 2012, provisional application No. 61/645,641, filed on May 11, 2012.

(51) Int. Cl.
*H04W 72/04* (2009.01)
*H04W 88/02* (2009.01)

(56) References Cited

U.S. PATENT DOCUMENTS

| | | |
|---|---|---|
| 2009/0318180 A1 | 12/2009 | Yi et al. |
| 2011/0092217 A1 | 4/2011 | Kim et al. |
| 2011/0105173 A1 | 5/2011 | Haim et al. |
| 2011/0243016 A1 | 10/2011 | Zhang et al. |
| 2012/0083310 A1 | 4/2012 | Zhao et al. |
| 2012/0113845 A1 | 5/2012 | Kim et al. |
| 2012/0178494 A1 | 7/2012 | Haim et al. |
| 2012/0182960 A1* | 7/2012 | Wang .......... H04W 52/365 370/329 |
| 2012/0207112 A1* | 8/2012 | Kim .......... H04W 52/146 370/329 |
| 2012/0224552 A1 | 9/2012 | Feuersanger et al. |
| 2013/0301568 A1 | 11/2013 | Park et al. |
| 2014/0018124 A1 | 1/2014 | Ahn et al. |
| 2015/0365907 A1* | 12/2015 | Kim .......... H04W 72/1284 370/329 |

FOREIGN PATENT DOCUMENTS

| | | | |
|---|---|---|---|
| CN | 103391609 B | 12/2016 | |
| EP | 2 445 293 A1 | 4/2012 | |
| WO | WO 2008/155469 A1 | 12/2008 | |
| WO | WO 2009/154403 A2 | 12/2009 | |
| WO | WO 2012/002684 A2 | 1/2012 | |
| WO | WO-2012000355 A1 * | 1/2012 | .......... H04W 52/365 |
| WO | WO 2012/060651 A2 | 5/2012 | |

OTHER PUBLICATIONS

English language Abstract for RU-2212106-C1 dated Sep. 10, 2003.

Ericsson et al., "Counterproposal to Corrections to the Carrier Aggregation Functionality in MAC," 3GPP TSG-RAN2, Meeting #73, R2-110937, Change Request 36.321 CR Version 10.0.0, Feb. 14, 2011, Taipei, Taiwan, 11 pages.

LG Electronics et al., "Correction to PHR functionality", 3GPP TSG-RAN2 Meeting #65, Athens, Greece, Feb. 9-13, 2009, 3 pages, R2-091978.

LG Electronics Inc. et al. "Correction to PHR Functionality," 3GPP TSG-RAN2, Meeting #65, R2-091978 (Rev of R2-091486), Change Request 36.321 CR 0266 Verion 8.4.0, Feb. 9-13, 2009, Athens, Greece, 3 pages.

3rd Generation Partnership Project, "Technical Specification Group Radio Access Network; Evolved Universal Terrestrial Radio Access (E-UTRA); Medium Access Control (MAC) Protocol Specification (Release 10)," 3GPP TS 36.321, V10.5.0, Mar. 2012, pp. 1-54.

Anite et al., "GCF Priority 4—Correction to EUTRA MAC Testcase 7.1.4.7a," 3GPP TSG RAN WG5 Meeting #54, R5-120269, Change Request, Dresden, Feb. 6-10, 2012, 10 pages.

* cited by examiner

FIG. 5

| R | R | PH | | Oct 1

FIG. 9

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH (Type 2, PCell)} |
| R | R | \multicolumn{6}{c}{$P_{CMAX,c}$ 1} |
| P | V | \multicolumn{6}{c}{PH (Type 1, PCell)} |
| R | R | \multicolumn{6}{c}{$P_{CMAX,c}$ 2} |
| P | V | \multicolumn{6}{c}{PH (Type 1, SCell 1)} |
| R | R | \multicolumn{6}{c}{$P_{CMAX,c}$ 3} |

| P | V | PH (Type 1, SCell n) |
|---|---|---|
| R | R | $P_{CMAX,c}$ m |

METHOD AND APPARATUS FOR PERFORMING POWER HEADROOM REPORTING PROCEDURE IN WIRELESS COMMUNICATION SYSTEM

CROSS-REFERENCE TO RELATED APPLICATIONS

This Application is a Continuation of U.S. patent application Ser. No. 15/641,637 filed on Jul. 5, 2017, which is a Continuation of U.S. patent application Ser. No. 15/180,747 filed on Jun. 13, 2016 (now U.S. Pat. No. 9,723,577 issued on Aug. 1, 2017), which is a Continuation of U.S. patent application Ser. No. 13/890,827 filed on May 9, 2013 (now U.S. Pat. No. 9,392,554 issued on Jul. 12, 2016), which claims the priority benefit under 35 U.S.C. § 119(e) to U.S. Provisional Application Nos. 61/677,451 filed on Jul. 30, 2012 and 61/645,641 filed on May 11, 2012, all of which are hereby expressly incorporated by reference into the present application.

BACKGROUND OF THE INVENTION

Field of the Invention

The present invention relates to wireless communications, and more particularly, to a method and apparatus for performing a power headroom reporting (PHR) procedure in a wireless communication system.

Discussion of the Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Transmit power needs to be properly regulated in order for a user equipment (UE) to transmit data to a base station (BS). When the transmit power is too low, the BS may not be able to correctly receive the data. When the transmit power is too high, even though the UE can receive data without any problem, it may act as an interference to another UE for receiving data. Therefore, the BS needs to optimize power used in uplink transmission of the UE from a system aspect.

In order for the BS to regulate the transmit power of the UE, essential information must be acquired from the UE. For this, power headroom reporting (PHR) of the UE is used. A power headroom implies power that can be further used in addition to the transmit power currently used by the UE. That is, the power headroom indicates a difference between maximum possible transmit power that can be used by the UE and the currently used transmit power. Upon receiving the PHR from the UE, the BS can determine transmit power used for uplink transmission of the UE at a next time on the basis of the received PHR. The determined transmit power of the UE can be indicated by using a size of a resource block (RB) and a modulation and coding scheme (MCS), and can be used when an uplink (UL) grant is allocated to the UE at a next time. Since radio resources may be wasted if the UE frequently transmits the PHR, the UE can define a PHR trigger condition and transmit the PHR only when the condition is satisfied.

According to a PHR trigger condition, there may be a case where the UE cannot transmit the PHR in a specific situation. In this case, a method of effectively determining a PHR trigger condition is required so that the UE can transmit the PHR.

SUMMARY OF THE INVENTION

The present invention provides a method and apparatus for performing a power headroom reporting (PHR) procedure in a wireless communication system. The present invention also provides a method for performing a PHR procedure if triggered PHR is not cancelled.

In an aspect, a method of performing, by a user equipment (UE), a power headroom reporting (PHR) procedure in a wireless communication system is provided. The method includes triggering at least one PHR, determining whether the triggered at least one PHR is not cancelled, and transmitting a PHR if it is determined that the triggered at least one PHR is not cancelled.

The triggered at least one PHR may comprise a first triggered PHR.

The PHR may be transmitted using a PHR media access control (MAC) control element (CE).

The PHR MAC CE may include an R field which is a reserved bit, and a power headroom field indicating a power headroom level.

The method may further include receiving uplink resources for transmission.

The method may further include performing a logical channel prioritization (LCP) by considering the uplink resources for a PHR MAC CE.

The method may further include determining whether the uplink resources for transmission can accommodate the PHR MAC CE plus its subheader as a result of the LCP.

The method may further include cancelling all triggered PHRs.

In another aspect, a user equipment (UE) in a wireless communication system is provided. The UE includes a radio frequency (RF) unit for transmitting or receiving a radio signal, and a processor configured for triggering at least one power headroom reporting (PHR), determining whether the triggered at least one PHR is not cancelled, and transmitting a PHR if it is determined that the triggered at least one PHR is not cancelled.

BRIEF DESCRIPTION OF THE DRAWINGS

FIG. 5 shows an example of a PHR MAC CE.

FIG. 9 shows an example of an extended PHR MAC CE.

DETAILED DESCRIPTION OF THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
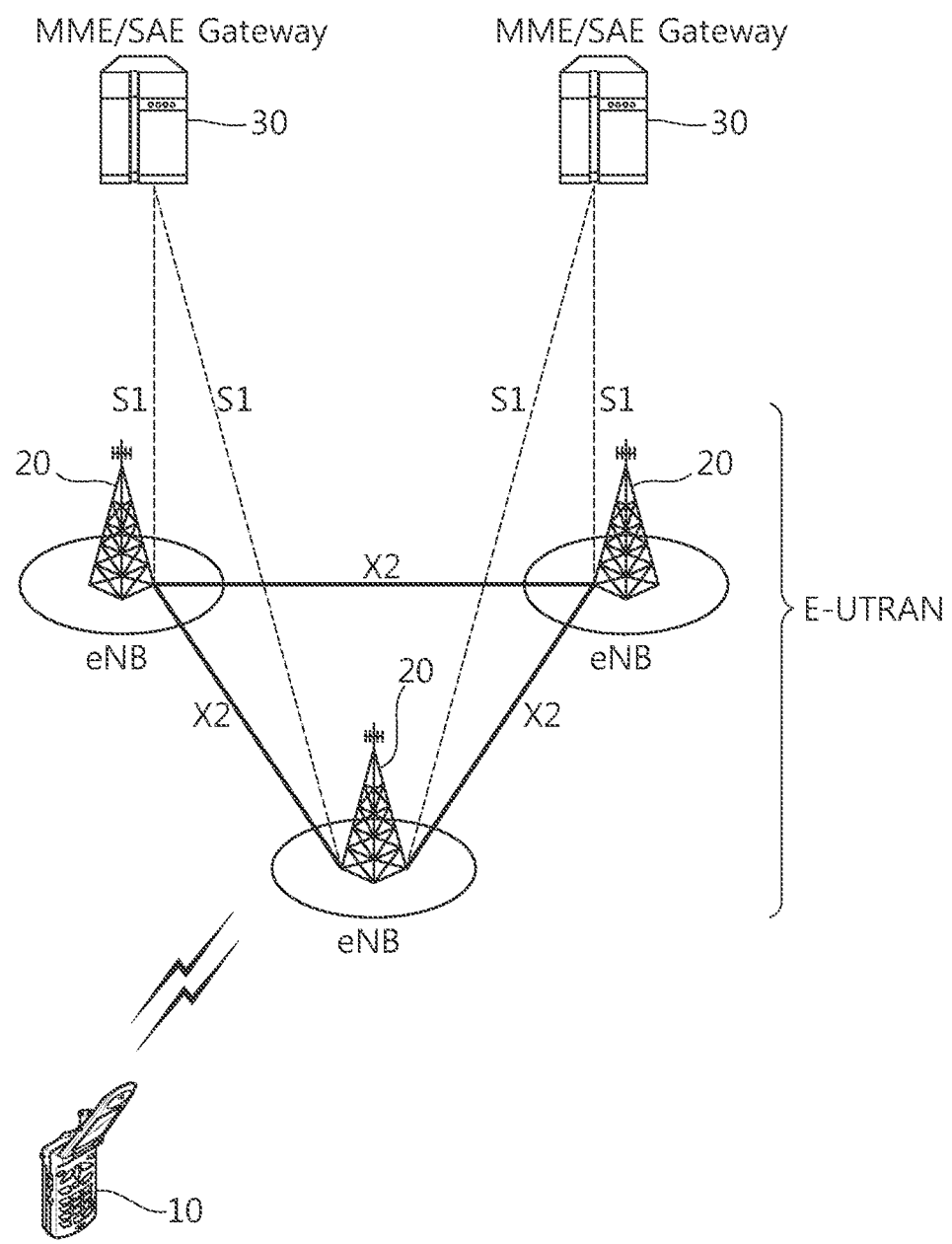
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 may be generally a fixed station that communicates with the UE 10 and may be referred to as another terminology, such as an evolved node-B (eNB), a base transceiver system (BTS), an access point, etc. There may be one or more cells within the coverage of the BS 20. A single cell may be configured to have one of bandwidths selected from 1.25, 2.5, 5, 10, and 20 MHz, etc., and may provide downlink or uplink transmission services to several UEs. In this case, different cells may be configured to provide different bandwidths.

Interfaces for transmitting user traffic or control traffic may be used between the BSs 20. The UE 10 and the BS 20 may be connected by means of a Uu interface. The BSs 20 may be interconnected by means of an X2 interface. The BSs 20 may be connected to an evolved packet core (EPC) by means of an S1 interface. The EPC may consist of a mobility management entity (MME), a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The MME is in charge of functionality of a control plane. The S-GW is in charge of functionality of a user plane. The BSs 20 may be connected to the MME 30 by means of an S1-MME interface, and may be connected to the S-GW by means of an S1-U interface. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
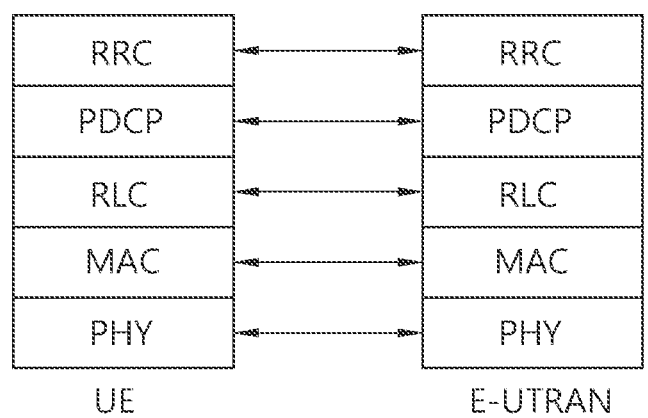
FIG. 2 is a diagram showing a radio interface protocol architecture for a control plane.
Figure 3:
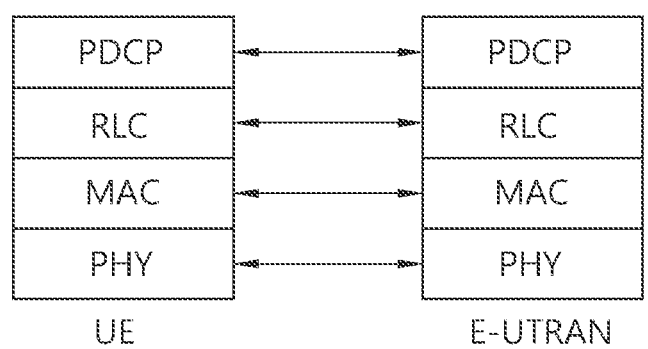
FIG. 3 is a diagram showing a radio interface protocol architecture for a user plane.

FIG. 2 is a diagram showing a radio interface protocol architecture for a control plane. FIG. 3 is a diagram showing a radio interface protocol architecture for a user plane.

Layers of a radio interface protocol between the UE and the E-UTRAN are classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane which is a protocol stack for control signal transmission and a user plane which is a protocol stack for data information transmission. The layers of the radio interface protocol may exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data may be transferred between the MAC layer and the PHY layer through the transport channel. The transport channel may be classified according to how and with what characteristics data is transmitted through a radio interface. Or, the transport channel may be classified into a dedicated transport channel and a common transport channel depending on whether or not to share the transport channel. Between different PHY layers, i.e., a PHY layer of a transmitter and a PHY layer of a receiver, data may be transferred through the physical channel. The physical channel may be modulated using an orthogonal frequency division multiplexing (OFDM) scheme, and utilizes time and frequency as a radio resource.

Figure 4:
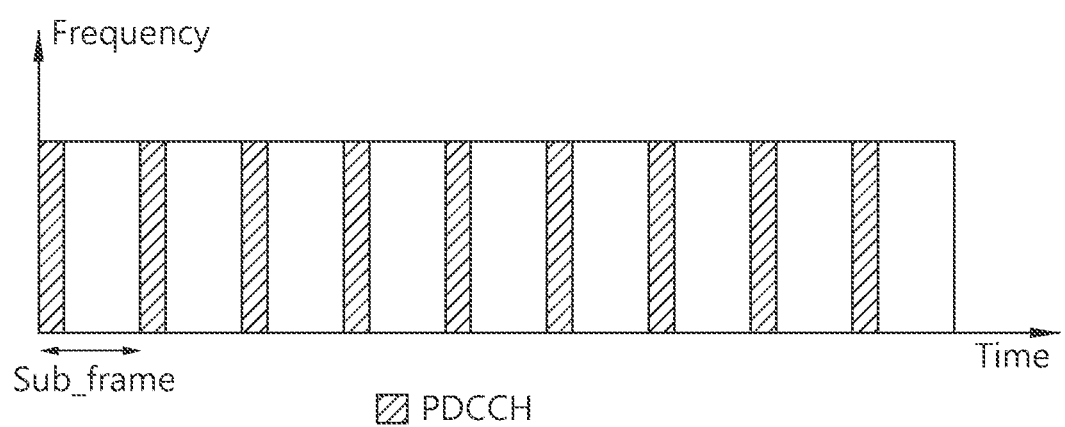
FIG. 4 shows an example of a physical channel structure.

FIG. 4 shows an example of a physical channel structure.

A physical channel may consist of a plurality of subframes in a time domain and a plurality of subcarriers in a frequency domain. One subframe may consist of a plurality of symbols in the time domain. One subframe may consist of a plurality of resource blocks (RBs). One RB may consist of a plurality of symbols and a plurality of subcarriers. In addition, each subframe may use specific subcarriers of specific symbols of a corresponding subframe for a physical downlink control channel (PDCCH). For example, a first symbol of the subframe may be used for the PDCCH. A transmission time interval (TTI) which is a unit time for data transmission may be equal to a length of one subframe.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel may be divided into a control channel for delivering information of the control plane and a traffic channel for delivering information of the user plane.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

A power headroom reporting (PHR) procedure of a user equipment is described. It may be referred to 3GPP TS 36.321 V8.12.0.

The PHR procedure is used to provide the serving eNB with information about the difference between the nominal UE maximum transmit power and the estimated power for uplink shared channel (UL-SCH) transmission. The RRC controls the PHR by configuring the two timers periodicPHR-Timer and prohibitPHR-Timer, and by signalling dl-PathlossChange which sets the change in measured downlink pathloss to trigger a PHR.

The PHR may be triggered if any of the following events occur:
  prohibitPHR-Timer expires or has expired and the path loss has changed more than dl-PathlossChange dB since the transmission of a PHR when UE has UL resources for new transmission;
  periodicPHR-Timer expires;
  upon configuration or reconfiguration of the power headroom reporting functionality by upper layers, which is not used to disable the function.

If the UE has UL resources allocated for new transmission for this TTI, the UE may perform following operations:
  if it is the first UL resource allocated for a new transmission since the last MAC reset, start periodicPHR-Timer;
  if the PHR procedure determines that at least one PHR has been triggered since the last transmission of a PHR or this is the first time that a PHR is triggered, and;
  if the allocated UL resources can accommodate a PHR MAC control element plus its subheader as a result of logical channel prioritization:
  obtain the value of the power headroom from the physical layer;
  instruct the multiplexing and assembly procedure to generate and transmit a PHR MAC control element based on the value reported by the physical layer;
  start or restart periodicPHR-Timer;
  start or restart prohibitPHR-Timer;
  cancel all triggered PHR(s).

Figure 5:
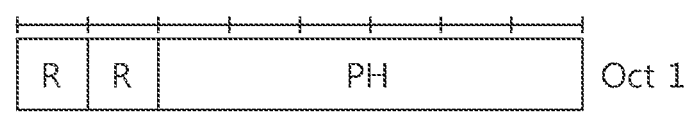

FIG. 5 shows an example of a PHR MAC CE.

The UE may transmit the PHR through the PHR MAC CE to the BS. The PHR MAC CE is identified by a MAC PDU subheader with LCID. The LCID may be allocated for the PHR MAC CE in the UL-SCH, and a value of the LCID may be 11010. It has a fixed size and consists of a single octet defined as follows:
  R: reserved bit, set to "0";
  Power headroom (PH): this field indicates the power headroom level. The length of the field is 6 bits, so total 64 power headroom levels may be indicated. Table 1 shows the reported PH and the corresponding power headroom levels.

TABLE 1

| PH | Power Headroom Level |
| --- | --- |
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

A carrier aggregation (CA) of the 3GPP LTE-A is described.

The carrier aggregation implies a system that configures a wideband by aggregating one or more carriers having a bandwidth smaller than that of a target wideband when the wireless communication system intends to support the wideband. The carrier aggregation can also be referred to as other terms such as a bandwidth aggregation system, or the like. A carrier which is a target when aggregating one or more carriers can directly use a bandwidth that is used in the legacy system in order to provide backward compatibility with the legacy system. For example, the 3GPP LTE can support a bandwidth of 1.4 MHz, 3 MHz, 5 MHz, 10 MHz, 15 MHz, and 20 MHz, and a 3GPP LTE-A can configure a wideband of 20 MHz or higher by using only the bandwidth of the 3GPP LTE.

Meanwhile, the concept of a cell can be applied in the 3GPP LTE-A. The cell is an entity configured by combining at least one unit of DL resources and selectively included UL resources from the perspective of a UE. That is, one cell must include at least one unit of DL resources, but may not include UL resources. The one unit of DL resources may be one DL component carrier (CC). A linkage between a carrier frequency of a DL resource and a carrier frequency of a UL resource can be indicated by a system information block (SIB)-2 transmitted using the DL resource. Although a CC will be taken as an example in the following descriptions of the present invention, it is apparent that the CC can be replaced with a cell.

Figure 6:
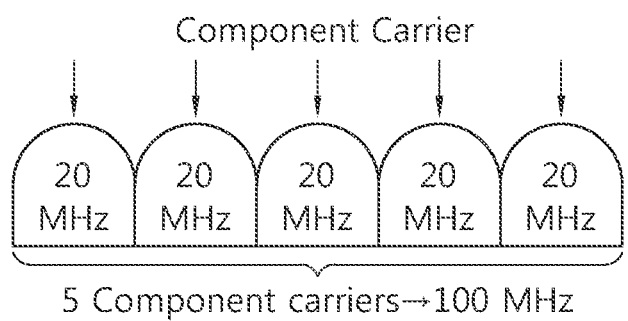
FIG. 6 shows an example of a wideband system using carrier aggregation for 3GPP LTE-A.

FIG. 6 shows an example of a wideband system using carrier aggregation for 3GPP LTE-A.

Referring to FIG. 6, each CC has a bandwidth of 20 MHz, which is a bandwidth of the 3GPP LTE. Up to 5 CCs may be aggregated, so maximum bandwidth of 100 MHz may be configured.

Figure 7:
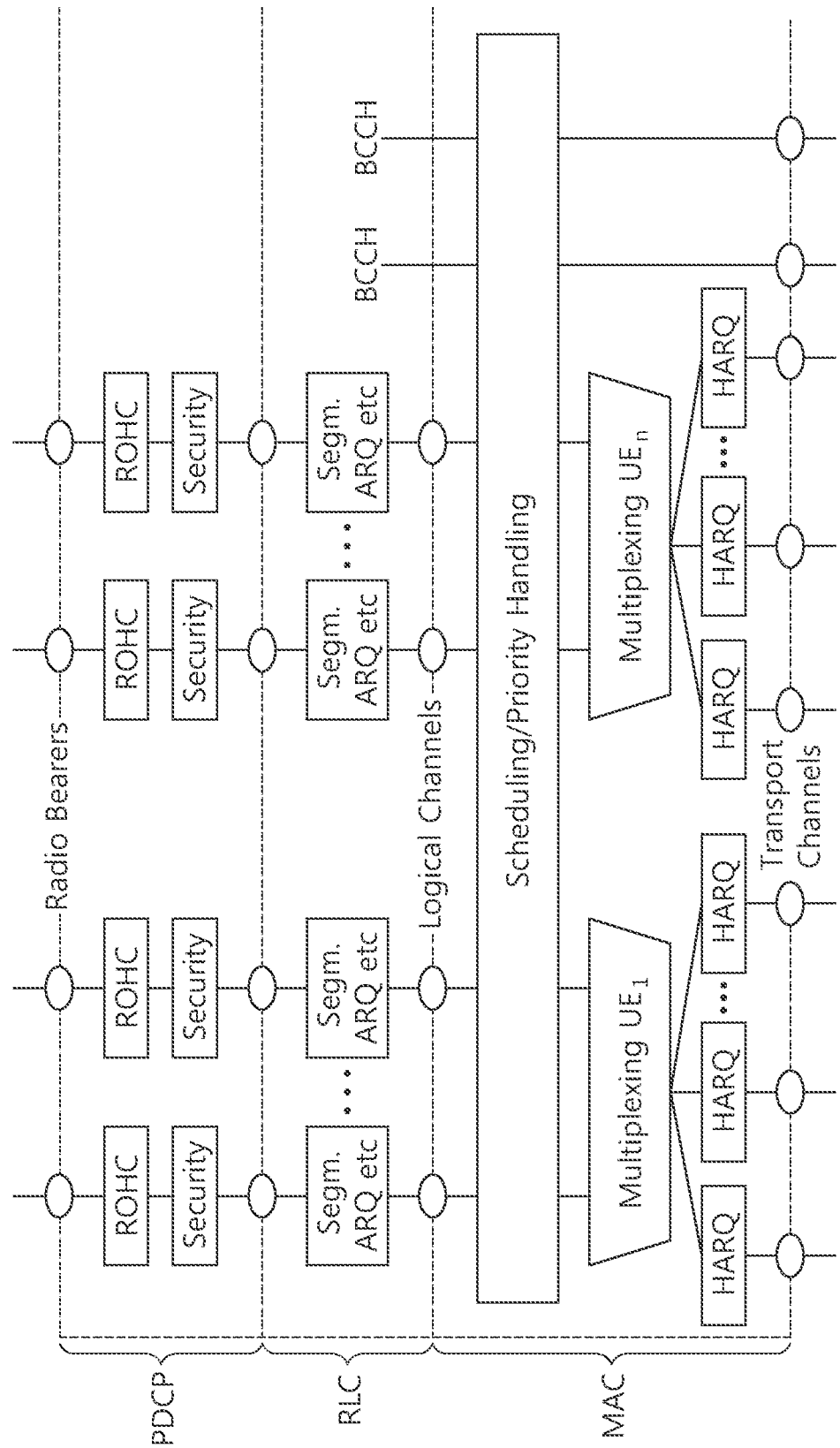
FIG. 7 shows an example of a structure of DL layer 2 when carrier aggregation is used.
Figure 8:
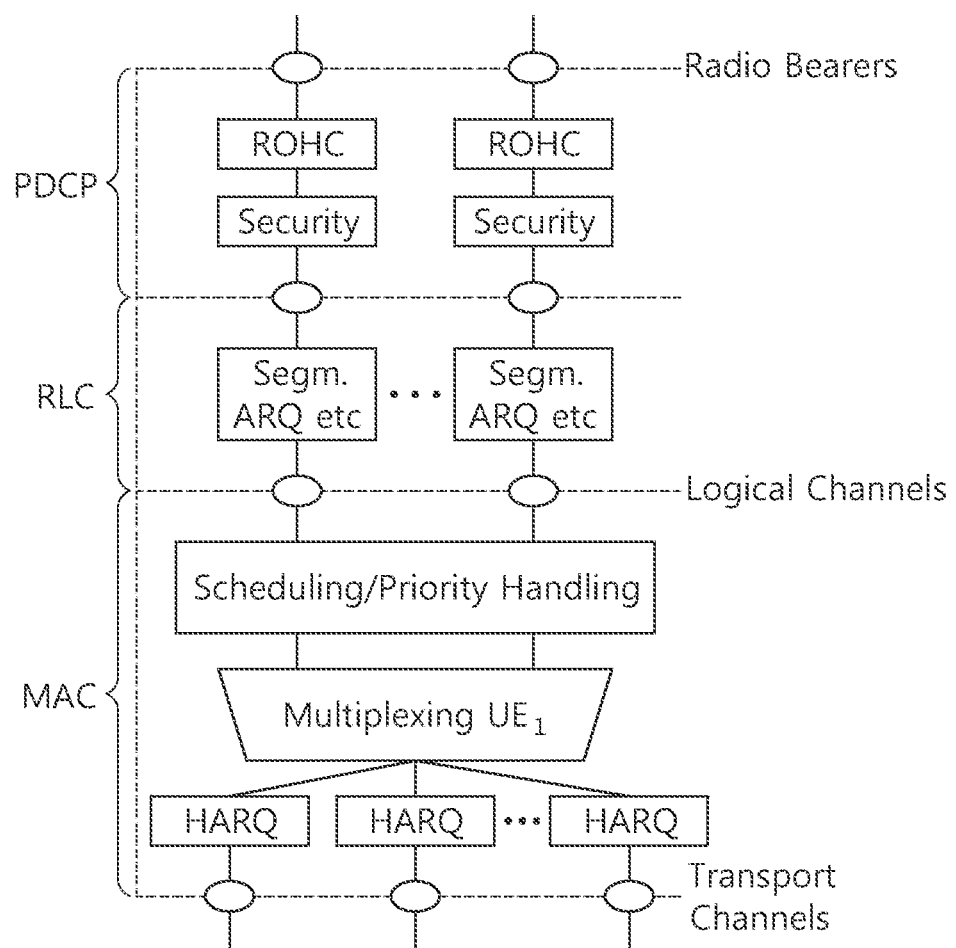
FIG. 8 shows an example of a structure of UL layer 2 when carrier aggregation is used.

FIG. 7 shows an example of a structure of DL layer 2 when carrier aggregation is used. FIG. 8 shows an example of a structure of UL layer 2 when carrier aggregation is used. The carrier aggregation may affect a MAC layer of the L2. For example, since the carrier aggregation uses a plurality of CCs, and each hybrid automatic repeat request (HARQ) entity manages each CC, the MAC layer of the 3GPP LTE-A using the carrier aggregation shall perform operations related to a plurality of HARQ entities. In addition, each HARQ entity processes a transport block independently. Therefore, when the carrier aggregation is used, a plurality of transport blocks may be transmitted or received at the same time through a plurality of CCs.

A PHR procedure of a user equipment when the carrier aggregation is used is described. It may be referred to 3GPP TS 36.321 V10.5.0.

The PHR procedure is used to provide the serving eNB with information about the difference between the nominal UE maximum transmit power and the estimated power for UL-SCH transmission per activated serving cell and also with information about the difference between the nominal UE maximum power and the estimated power for UL-SCH and PUCCH transmission on a primary cell (PCell).

The RRC controls the PHR by configuring the two timers periodicPHR-Timer and prohibitPHR-Timer, and by signalling dl-PathlossChange which sets the change in measured downlink pathloss and the required power backoff due to power management to trigger a PHR.

The PHR may be triggered if any of the following events occur:

prohibitPHR-Timer expires or has expired and the path loss has changed more than dl-PathlossChange dB for at least one activated serving cell which is used as a pathloss reference since the last transmission of a PHR when the UE has UL resources for new transmission;
periodicPHR-Timer expires;

upon configuration or reconfiguration of the power headroom reporting functionality by upper layers, which is not used to disable the function;
activation of a secondary cell (SCell) with configured uplink;
prohibitPHR-Timer expires or has expired, when the UE has UL resources for new transmission, and in this TTI, there are UL resources allocated for transmission or there is a PUCCH transmission on this cell, and the required power backoff due to power management for this cell has changed more than dl-PathlossChange dB since the last transmission of a PHR when the UE had UL resources allocated for transmission or PUCCH transmission on this cell, for any of the activated serving cells with configured uplink.

Meanwhile, the UE should avoid triggering a PHR when the required power backoff due to power management decreases only temporarily (e.g. for up to a few tens of milliseconds) and it should avoid reflecting such temporary decrease in the values of $P_{CMAX,c}$/PH when a PHR is triggered by other triggering conditions.

If the UE has UL resources allocated for new transmission for this TTI, the UE may perform following operations:

if it is the first UL resource allocated for a new transmission since the last MAC reset, start periodicPHR-Timer;
if the PHR procedure determines that at least one PHR has been triggered since the last transmission of a PHR or this is the first time that a PHR is triggered, and;
if the allocated UL resources can accommodate a PHR MAC control element plus its subheader if extendedPHR is not configured, or the extended PHR MAC control element plus its subheader if extendedPHR is configured, as a result of logical channel prioritization:
if extendedPHR is configured:
for each activated serving cell with configured uplink:
obtain the value of the type 1 power headroom;
if the UE has UL resources allocated for transmission on this serving cell for this TTI:
obtain the value for the corresponding $P_{CMAX,c}$ field from the physical layer;
if simultaneous PUCCH-PUSCH is configured:
obtain the value of the type 2 power headroom for the PCell;
if the UE has a PUCCH transmission in this TTI:
obtain the value for the corresponding $P_{CMAX,c}$ field from the physical layer;
instruct the multiplexing and assembly procedure to generate and transmit an extended PHR MAC control element based on the values reported by the physical layer;
else:
obtain the value of the type 1 power headroom from the physical layer;
instruct the multiplexing and assembly procedure to generate and transmit a PHR MAC control element based on the value reported by the physical layer;
start or restart periodicPHR-Timer;
start or restart prohibitPHR-Timer;
cancel all triggered PHR(s).

That is, the UE can report a PH to the BS with respect to all activated serving cells. A PH for each serving cell can be determined as a value remaining after subtracting an output value currently used in a specific serving cell from a maximum output value of the UE for the serving cell. If the PHR is triggered and a UL grant is allocated only some serving cells, the serving cells to which the UL grant is allocated can calculate a PH by using the UL grant, and the remaining serving cells can calculate a PH by using a pre-defined reference format. The maximum output value of the UE with respect to the serving cell is a value excluding a power reduction portion applicable within a range of a maximum power reduction (MPR) value. When calculating the maximum output value of the UE, the power reduction portion may differ within the range of the MPR value according to an implementation of each UE. Therefore, in order to more correctly report the PHR, the UE can transmit the PHR by additionally including a maximum output value $P_{CMAX,c}$ excluding the power reduction portion.

A PHR MAC CE used for transmitting the PHR when the carrier aggregation is used may be the same as the PHR MAC CE shown in FIG. 5.

FIG. 9 shows an example of an extended PHR MAC CE.

The extended PHR MAC CE is identified by a MAC PDU subheader with LCID. It has a variable size. When type 2 PH is reported, the octet containing the type 2 PH field is included first after the octet indicating the presence of PH per SCell and followed by an octet containing the associated $P_{CMAX,c}$ field (if reported). Then follows in ascending order based on the ServCellIndex an octet with the type 1 PH field and an octet with the associated $P_{CMAX,c}$ field (if reported), for the PCell and for each SCell indicated in the bitmap.

The extended PHR MAC CE is defined as follows:

$C_i$: this field indicates the presence of a PH field for the SCell with SCellIndex i. The $C_i$ field set to "1" indicates that a PH field for the SCell with SCellIndex i is reported. The $C_i$ field set to "0" indicates that a PH field for the SCell with SCellIndex i is not reported;

R: reserved bit, set to "0";

V: this field indicates if the PH value is based on a real transmission or a reference format. For type 1 PH, V=0 indicates real transmission on PUSCH and V=1 indicates that a PUSCH reference format is used. For type 2 PH, V=0 indicates real transmission on PUCCH and V=1 indicates that a PUCCH reference format is used. Furthermore, for both type 1 and type 2 PH, V=0 indicates the presence of the associated $P_{CMAX,c}$ field, and V=1 indicates that the associated $P_{CMAX,c}$ field is omitted;

Power headroom (PH): this field indicates the power headroom level. The length of the field is 6 bits. Table 1 described above shows the reported PH and the corresponding power headroom levels.

P: this field indicates whether the UE applies power backoff due to power management. The UE shall set P=1 if the corresponding $P_{CMAX,c}$ field would have had a different value if no power backoff due to power management had been applied;

$P_{CMAX,c}$: if present, this field indicates the $P_{CMAX,c}$ or $P_{CMAX,c}$ used for calculation of the preceding PH field. Table 2 shows the reported $P_{CMAX,c}$ and the corresponding nominal UE transmit power levels.

TABLE 2

| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

A logical channel prioritization (LCP) is described. It may be referred to 3GPP TS 36.321 V10.5.0.

In order to provide various types of services, at least one RB may be configured. A logical channel is allocated to a RB. A plurality of logical channels corresponding to a plurality of RBs are multiplexed and transmitted through one transport block (i.e. MAC PDU).

The LCP is a method for multiplexing data of the plurality of RBs (i.e. a plurality of logical channels) into a transport block (i.e. MAC PDU). LCP determines how much amount of given radio resources are allocated to each of the plurality of RBs.

The LCP procedure is applied when a new transmission is performed. The RRC controls the scheduling of uplink data by signalling for each logical channel: priority where an increasing priority value indicates a lower priority level, prioritizedBitRate which sets the prioritized bit rate (PBR), and bucketSizeDuration which sets the bucket size duration (BSD). The priority may have a value between 1 and 8. The priority having a value of 1 indicates the highest priority, and the priority having a value of 8 indicates the lowest priority. The PBR indicates a minimum bit rate guaranteed for corresponding RB. That is, a bit rate indicated by the PBR is always guaranteed.

The UE shall maintain a variable Bj for each logical channel j. Bj shall be initialized to zero when the related logical channel is established, and incremented by the product PBR×TTI duration for each TTI, where PBR is prioritized bit rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The UE shall perform the following LCP procedure when a new transmission is performed. The UE shall allocate resources to the logical channels in the following steps.

Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s);

Step 2: The UE shall decrement Bj by the total size of MAC SDUs served to logical channel j in Step 1. The value of Bj can be negative.

Step 3: If any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources;

if the UE segments an RLC SDU from the logical channel, it shall maximize the size of the segment to fill the grant as much as possible;

the UE should maximize the transmission of data.

if the UE is given an UL grant size that is equal to or larger than 4 bytes while having data available for transmission, the UE shall not transmit only padding BSR and/or padding (unless the UL grant size is less than 7 bytes and an AMD PDU segment needs to be transmitted).

The UE shall not transmit data for a logical channel corresponding to a radio bearer that is suspended.

A priority and/or a PBR of a logical channel of each RB are transmitted from a RRC layer of a network to a RRC layer of an UE through a RB setup message when the RB is initially configured. The RRC layer of the UE which receives the RB setup message configures a RB and sends information on the LCP and the PBR of the logical channel of each RB to the MAC layer of the UE. The MAC layer that receives the information determines amounts of transmission data of the RB according to the LCP for each TTI.

Figure 10:
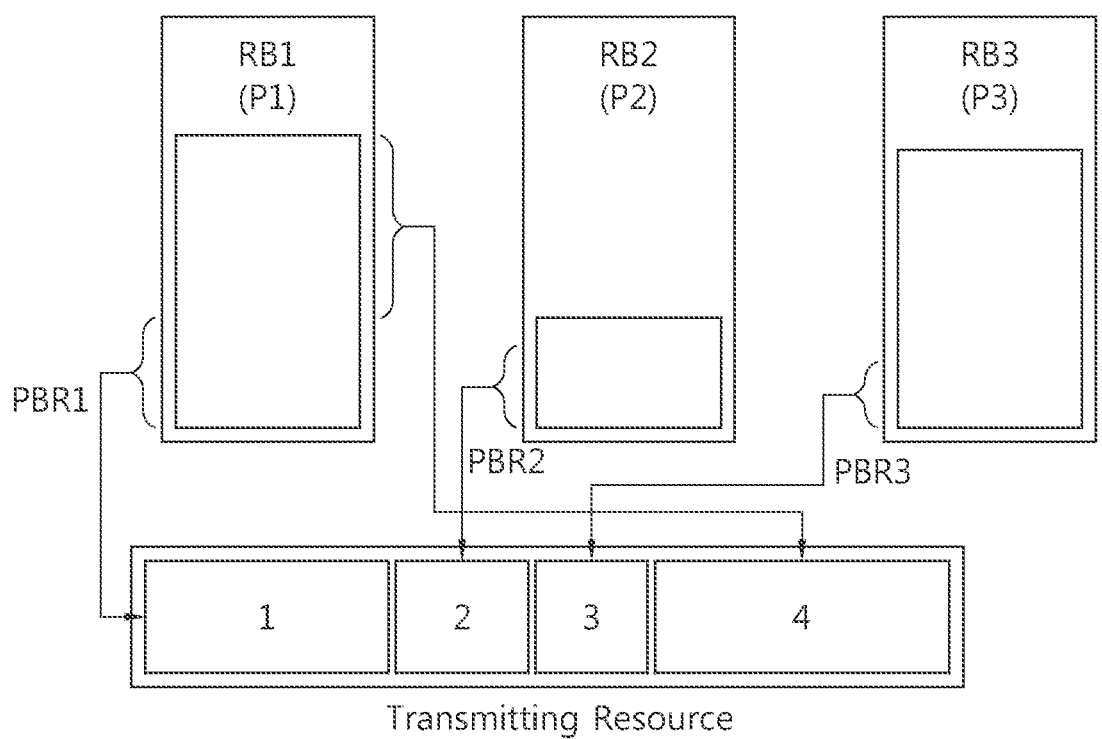
FIG. 10 shows an example of a logical channel prioritization (LCP) procedure.

FIG. 10 shows an example of a logical channel prioritization (LCP) procedure.

Referring to FIG. 10, there are three RBs, i.e., an RB1 to which a logical channel of a highest priority P1 is mapped, an RB2 to which a logical channel of a second priority P2 is mapped, and an RB3 to which a logical channel of a lowest priority P3 is mapped. In addition, a PBR of the RB1 is a PBR 1, a PBR of the RB2 is a PBR 2, and a PBR or a RB3 is a PBR 3. First, a transmission data amount is determined according to data corresponding to a PRB in each RB in a descending order of priority of logical channels mapped to the RB1, the RB2, and the RB3. That is, the transmission data amount can be determined to the PBR 1 in the RB1, the PBR 2 in the RB2, and the PBR 3 in the RB3. Since there are remaining radio resources even if a transmission data amount corresponding to the PBR in each RB is fully allocated, the remaining radio resources can be allocated to the RB1 having the highest priority.

For the LCP procedure, the UE shall take into account the following relative priority in decreasing order:

MAC control element for C-RNTI or data from UL-CCCH;

MAC control element for BSR, with exception of BSR included for padding;

MAC control element for PHR;

data from any Logical Channel, except data from UL-CCCH;

MAC control element for BSR included for padding.

When the UE is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when UE is requested to transmit multiple MAC PDUs in one TTI.

A random access procedure is described.

The UE can perform a random access procedure in the following cases.

When the UE performs an initial access to the BS in a situation where there is no RRC connection with the BS.

When the UE initially accesses to a target cell in a handover procedure.

When it is requested by a command of the BS.

When data to be transmitted in an uplink is generated in a situation where uplink time misalignment occurs or a designated radio resource used to request a radio resource is not allocated.

When a recovery process is performed at the occurrence of a radio link failure or a handover failure.

In an LTE system, a non-contention based random access procedure allocating, by a BS, a designated (or dedicated) random access preamble to a particular UE and randomly accessing, by the UE, with the random access preamble is provided. In other words, the procedure of selecting a random access preamble includes a contention based random access procedure that a UE randomly selects one random access preamble from a particular set and uses the same and a non-contention based random access procedure that a UE uses a random access preamble allocated thereto. A difference between the two random access procedures lies in a generation of collision due to contention as described hereinafter. The non-contention based random access procedure may be used only when the foregoing handover process is performed or when it is requested by a command from a BS.

Figure 11:
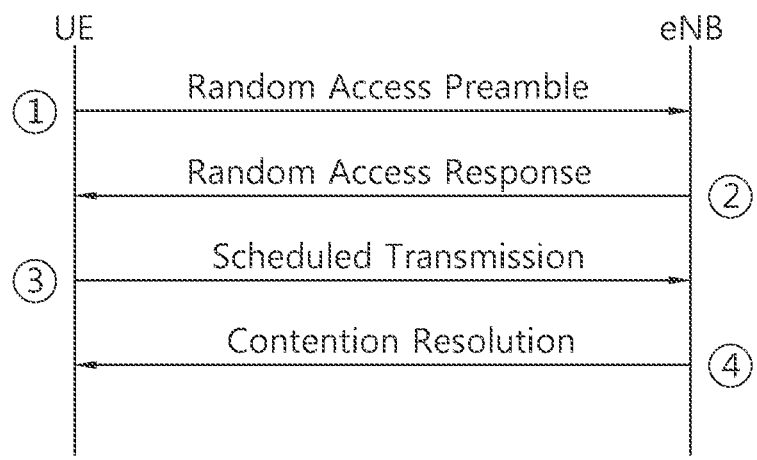
FIG. 11 shows an example of an operation process of a UE and a base station in a contention-based random access procedure.

FIG. 11 shows an example of an operation process of a UE and a base station in a contention-based random access procedure.

1. In the contention based random access, a UE randomly selects one random access from a set of random access preambles indicated by system information or a handover command, selects a PRACH resource able to transmit the random access preamble, and transmits the same.

2. After the random access preamble is transmitted, the UE attempts to receive a random access response thereof within a random access response reception window indicated by the system information or the handover command. In detail, the random access response information is transmitted in the form of a MAC PDU, and the MAC PDU is transferred on a PDSCH. In order to allow the UE to properly receive the information transmitted on the PDSCH, a PDCCH is also transferred together. Namely, the PDCCH includes information regarding a UE which is to receive the PDSCH, frequency and time information of radio resource of the PDSCH, a transmission format of the PDSCH, and the like. When the UE successfully receives the PDCCH destined therefor, the UE appropriately receives the random access response transmitted on the PDSCH according to the information items of the PDCCH. The random access response includes a random access preamble identifier (ID), a UL grant (uplink radio resource), a temporary C-RNTI, and a time alignment command (TAC). In the above, the reason why the random access preamble identifier is required is because, since a single random access response may include random access response information for one or more UEs, so the random access preamble identifier informs for which UE the UL grant, temporary C-RNTI, and TAC are valid. The random access preamble identifier is identical to a random access preamble selected by the UE in 1.

3. When the UE receives the random access response valid therefor, the UE processes the information items included in the random access response. Namely, the UE applies the TAC and stores the temporary C-RNTI. Also, the UE transmits data stored in a buffer thereof or newly generated data to the BS by using the UL grant. In this case, an identifier of the UE should be included in the data included in the UL grant. The reason is because, in the contention based random access procedure, the BS cannot determine which UEs perform the random access procedure, so in order to resolve collision later, the BS should identify UEs. Also, there are two types of methods for including an identifier of the UE. A first method is that when the UE has a valid cell identifier already allocated in the corresponding cell before the random access procedure, the UE transmits its cell identifier through the UL grant. Meanwhile, when the UE has not been allocated a valid cell identifier before the random access procedure, the UE includes its unique identifier (e.g., an S-TMSI or a random ID) in data and transmits the same. In general, the unique identifier is longer than a cell identifier. When the UE transmits the data through the UL grant, the UE starts a contention resolution timer.

4. After the UE transmits the data including its identifier through the UL grant included in the random access response, the UE waits for an instruction from the BS for a collision resolution. Namely, in order to receive a particular message, the UE attempts to receive a PDCCH. There are two methods for receiving a PDCCH. As mentioned above, when the identifier of the UE transmitted through the UL grant is a cell identifier, the UE attempts to receive a PDCCH by using its cell identifier, and when the identifier is a unique identifier, the UE attempts to receive a PDCCH by using the temporary C-RNTI included in the random access response. Thereafter, in the former case, when a PDCCH is received through its cell identifier before the contention resolution timer expires, the UE determines that the random access procedure has been normally performed, and terminates the random access procedure. In the latter case, when the UE receives a PDCCH through the temporary cell identifier before the contention resolution time expires, the UE checks data transferred by the PDSCH indicated by the PDCCH. When the data content includes its unique identifier, the UE determines that the random access procedure has been normally performed, and terminates the random access procedure.

Figure 12:
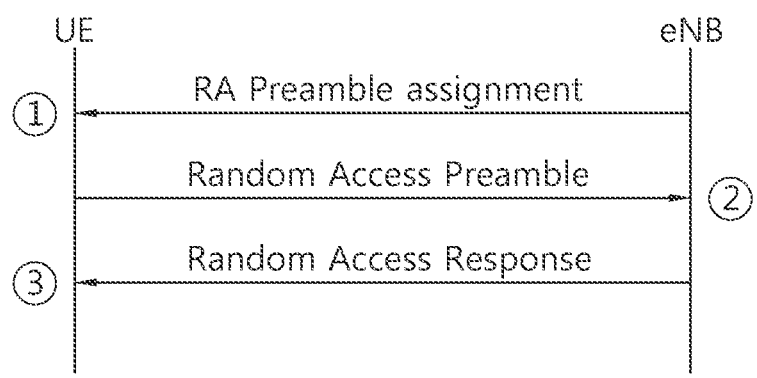
FIG. 12 shows an example of an operation process of a UE and that a base station in a non-contention based random access procedure.

FIG. 12 shows an example of an operation process of a UE and that a base station in a non-contention based random access procedure. Additionally, in comparison to the contention based random access procedure, in the non-contention based random access procedure, upon receiving random access response information, it is determined that a random access procedure has been normally performed, and the random access procedure is terminated.

1. As mentioned above, the non-contention based random access procedure may exist, first, in the case of a handover process, and second, in the case of being requested by a command from a BS. Of course, in the two cases, the contention based random access procedure may be performed. First, for the non-contention based random access procedure, it is important to receive a designated random access preamble eliminating a possibility of collision. A method of receiving an indication of the random access preamble includes a handover command and a PDCCH command.

2. After receiving the allocated random access preamble designated only for the UE, the UE transmits the preamble to the BS.

3. A method of receiving random access response information is the same as that in the contention-based random access procedure.

As described above, a PHR is transmitted when specific conditions are met. When the UE receives a UL grant from the BS, the UE checks whether a MAC PDU indicated by the UL grant can include a PHR MAC CE as a result of a LCP procedure. That is, provided that the UE has the UL grant that can accommodate the PHR MAC CE, the PHR is transmitted by including the PHR MAC CE in the MAC PDU if one of the following two conditions is met.

At least one PHR has been triggered since the last transmission of a PHR, or

This is the first time that a PHR is triggered

However, with the current PHR procedure, a following scenario may happen.

The first PHR is triggered since the RRC connection establishment.

The UE receives the first UL grant after the first PHR is triggered. It is assumed that the first received UL grant cannot accommodate a PHR MAC CE as a result of the LCP procedure. For example, when the UL grant may indicate a MAC PDU having a size of 56 bits, the MAC PDU may include 16 bits C-RNTI MAC CE including 8 bits MAC subheader and 24 bits long BSR MAC CE including 8 bits MAC subheader. In this case, the MAC PDU cannot accommodate the PHR MAC CE according to priorities of data as a result of the LCP procedure.

Consequently, the transmission of the PHR cannot be made and the first triggered PHR remains not cancelled.

The second PHR is triggered before the second UL grant.

The second UL grant that is large enough to accommodate the PHR MAC CE is received.

In this scenario, though there are triggered PHRs (i.e., the first and second PHRs) that have not yet been cancelled and there is the second UL grant that can accommodate the PHR MAC CE, the UE cannot make, according to the current PHR procedure, the transmission of the PHR at the last step of the above scenario because:

There is not the last transmission of the PHR, i.e., any PHR has not be transmitted since the RRC connection establishment, nor;

This is not the first time that a PHR is triggered, i.e., it is the second time.

Even if the PHRs are continuously triggered, and the UE receives UL grants which can include the PHR MAC CE, the UE cannot transmit triggered PHR. As a result, the triggered PHR cannot be transmitted, and the transmission of the PHR may be stuck.

The PHR stuck problem described above may happen during a handover procedure as follows.

The UE establishes the RRC connection with the eNB that is not using the PHR functionality. Note that the PHR functionality is currently optional.

E.g., upon the UE's movement, the UE receives the handover command including MAC-MainConfig including phr-Config.

The UE reconfigures MAC-MainConfig, which triggers a PHR for the first time.

The UE is asked to perform a contention based RA procedure toward the target cell.

The UE receives the first UL grant (56 bits) in the RA response.

The UE starts periodicPHR-Timer with short value, e.g., 10 or 20 ms.

The UE generates a MAC PDU just including 24 bits C-RNTI MAC CE including MAC subheader and 32 bits long BSR MAC CE including MAC subheader as a result of the LCP procedure. Therefore, the PHR cannot be transmitted, which means there is no PHR transmission.

periodicPHR-Timer expires, which triggers a PHR for the second time.

The UE receives the second UL grant.

Though the UE receives the second UL grant that is large enough to accommodate the PHR MAC CE, the UE cannot transmit the PHR because the UE never meets the aforementioned conditions considering it is the second time that a PHR is triggered and no transmission of a PHR is made yet.

Here, a method for performing a PHR procedure when the PHR stuck problem may happen according to an embodiment of the present invention is described.

To avoid the PHR stuck problem if it is considered an issue, various approaches could be basically possible. For example, to rely on the eNB control to make sure that e.g. in the aforementioned handover scenario, the UE may be provided with the second UL grant before the second PHR is triggered by e.g., avoiding small values of periodicPHR-Timer. However, considering that the completion time of a contention based random access procedure is not predictable, we consider the PHR stuck problem as unavoidable even if we rely on the smart eNB control. Also, the consequence to this situation would seem severe because there is no means to solve except the RRC connection release. Accordingly, the change of conditions for transmitting triggered PHR may be needed.

Therefore, it is proposed that the in the above scenario, a UE can transmit the first triggered PHR in the next UL grant that can accommodate the PHR MAC CE or extended PHR MAC CE after the first UL grant that cannot accommodate the PHR MAC CE or extended PHR MAC CE if at least one PHR has been triggered and not cancelled. That is, the UE may transmit the PHR which is triggered but not cancelled. If there is not triggered PHR not cancelled, the UE does not transmit the PHR to the BS. If multiple PHRs are triggered, and there is at least one triggered PHR not cancelled, the UE may transmit the triggered PHR to the BS.

Figure 13:
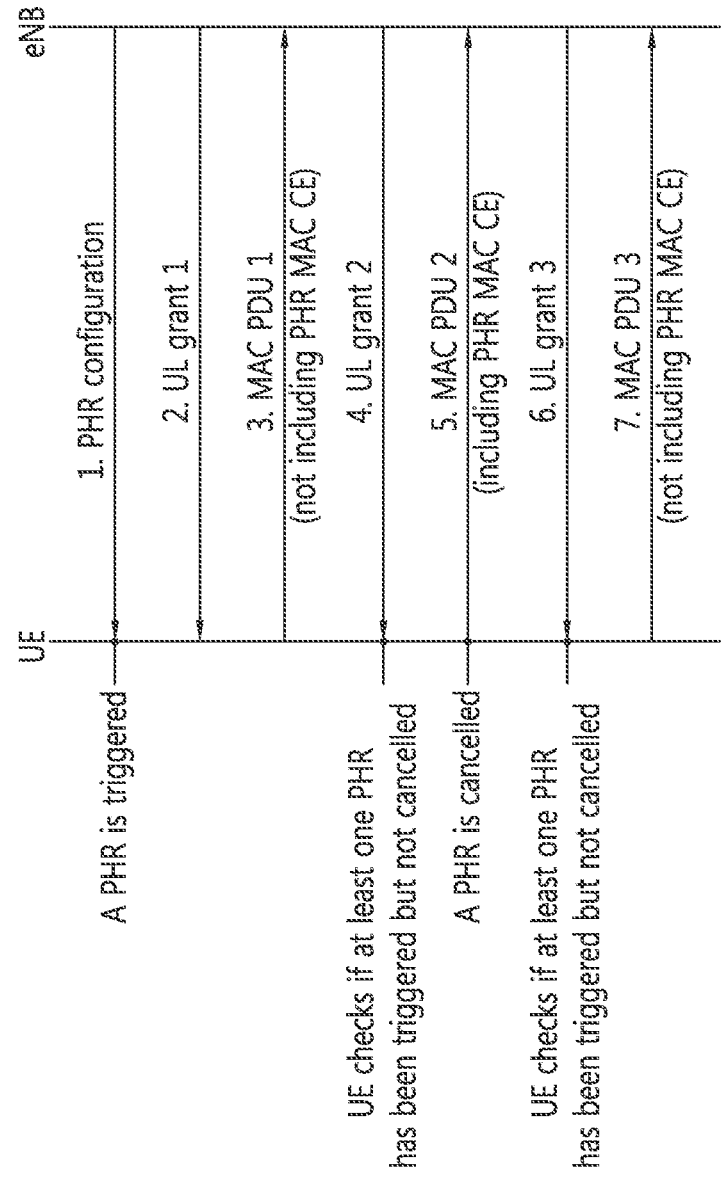
FIG. 13 shows an example of a method for performing a PHR procedure according to an embodiment of the present invention.

FIG. 13 shows an example of a method for performing a PHR procedure according to an embodiment of the present invention.

1. A UE receives a PHR configuration from a BS. A PHR procedure may be configured by the PHR configuration. The PHR configuration may be received through an RRC connection reconfiguration message. A PHR is triggered according to the PHR configuration by the UE.

2. The UE receives a first UL grant from the BS. The first UL grant may be received through a PDCCH or a random access response message.

3. The UE configures a first MAC PDU by the first UL grant as a result of an LCP procedure. The UE checks whether the first MAC PDU indicated by the first UL grant can include a PHR MAC CE or not. It is assumed that the first MAC PDU does not include a PHR MAC CE because of a size of the first MAC PDU and priorities of data to be transmitted. The UE transmits the configured first MAC PDU to the BS.

The PHR MAC CE may be an extended PHR MAC CE if the extended PHR MAC CE is configured. The BS may configure the extended PHR MAC CE to the UE. In addition, if the extended PHR MAC CE is configured, the UE may check whether the MAC PDU indicated by the received UL grant can include the extended PHR MAC CE or not. If the extended PHR MAC CE is not configured, the UE may check whether the MAC PDU indicated by the received UL grant can include the PHR MAC CE or not.

4. The UE receives a second UL grant from the BS. The second UL grant may be received through a PDCCH or a random access response message. It is assumed that a second MAC PDU, configured by the second UL grant, can include a PHR MAC CE as a result of the LCP procedure. The UE checks if at least one PHR has been triggered but not cancelled.

5. In FIG. 13, there is a PHR triggered but not cancelled. Accordingly, the UE configures the second MAC PDU including the PHR MAC CE, and transmits the second MAC PDU to the BS. The UE cancels all triggered PHRs.

6. The UE receives a third UL grant from the BS. The third UL grant may be received through a PDCCH or a random access response message. It is assumed that a third MAC PDU, configured by the third UL grant, can include a PHR MAC CE as a result of the LCP procedure. The UE checks if at least one PHR has been triggered but not cancelled.

7. It is assumed that additional PHR is not triggered since all triggered have been canceled in step 5. Accordingly, the UE configures the third MAC PDU not including the PHR MAC CE, and transmits the third MAC PDU to the BS.

Accordingly, the UE may perform following operations according to an embodiment of the present invention if the UE has UL resources allocated for new transmission for this TTI.

if it is the first UL resource allocated for a new transmission since the last MAC reset, start periodicPHR-Timer;
if the PHR procedure determines that at least one PHR has been triggered and not cancelled, and;
if the allocated UL resources can accommodate a PHR MAC control element plus its subheader as a result of logical channel prioritization:
obtain the value of the power headroom from the physical layer;
instruct the multiplexing and assembly procedure to generate and transmit a PHR MAC control element based on the value reported by the physical layer;
start or restart periodicPHR-Timer;
start or restart prohibitPHR-Timer;
cancel all triggered PHR(s).

Figure 14:
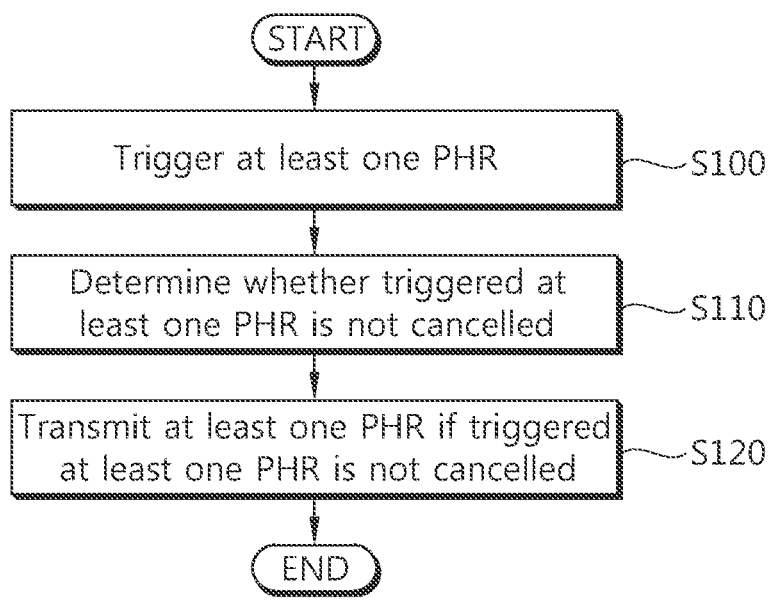
FIG. 14 shows another example of a method for performing a PHR procedure according to an embodiment of the present invention.

FIG. 14 shows another example of a method for performing a PHR procedure according to an embodiment of the present invention.

At step S100, the UE triggers at least one PHR. At step S110, the UE determines whether the triggered at least one PHR is not cancelled. If it is determined that the triggered at least one PHR is not cancelled, at step S120, the UE transmits a PHR.

Figure 15:
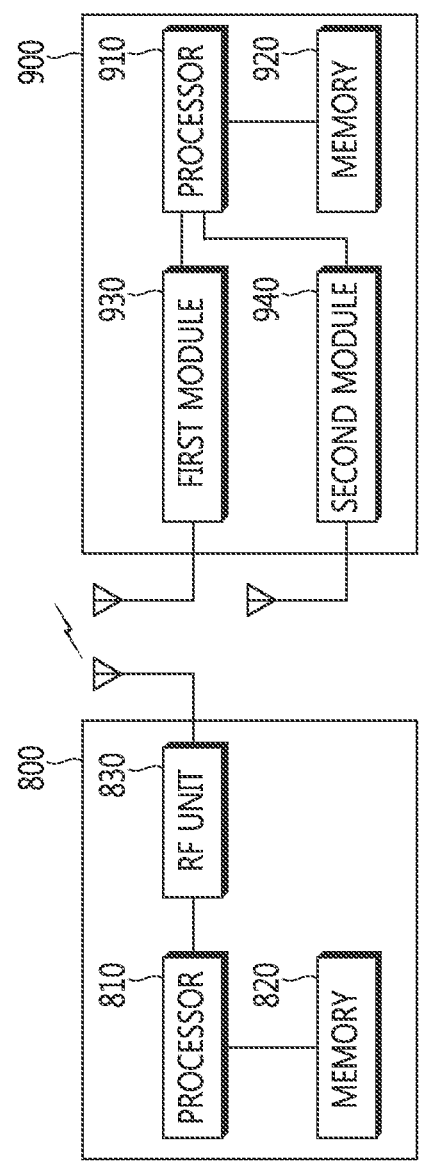
FIG. 15 is a block diagram showing wireless communication system to implement an embodiment of the present invention.

FIG. 15 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, in a situation that the PHR stuck problem may occur according to the current PHR procedure, the PHR can be transmitted.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a wireless device in a wireless communication system, the method comprising:
   receiving power headroom report (PHR) configuration information;
   triggering a PHR based on the received PHR configuration information;
   transmitting a PHR media access control (MAC) control element (CE) for the triggered PHR based on (i) at least one triggered PHR not having been cancelled, and (ii) allocated uplink (UL) resources able to accommodate the PHR MAC CE plus its subheader; and
   based on a determination to transmit the PHR MAC CE for the triggered PHR, canceling all triggered PHRs,
   wherein the PHR configuration information is received from a network in a handover command.

2. The method of claim 1, wherein the PHR MAC CE includes (i) an R field which is a reserved bit, and (ii) a power headroom field informing a power headroom level for the wireless device.

3. The method of claim 1, wherein the PHR MAC CE includes an extended PHR MAC CE.

4. The method of claim 1, wherein the PHR is triggered by reconfiguring the PHR configuration information.

5. The method of claim 1, wherein receiving the PHR configuration information comprises:
   receiving information regarding (i) a PHR-prohibit timer, and (ii) a threshold pathloss change.

6. The method of claim 5, wherein triggering the PHR based on the received PHR configuration information comprises:
   triggering the PHR based on (i) an expiration of the PHR-prohibit timer, and (ii) a change in downlink pathloss value by more than the threshold pathloss change.

7. The method of claim 6, further comprising:
   starting or restarting the PHR-prohibit timer based on the determination to transmit the PHR MAC CE for the triggered PHR.

8. The method of claim 5, wherein receiving the PHR configuration information further comprises receiving information regarding a PHR-periodic timer, and wherein the method further comprises:
   starting the PHR-periodic timer based on triggering the PHR.

9. The method of claim 8, further comprising:
   starting or restarting both the PHR-prohibit timer and the PHR-periodic timer based on the determination to transmit the PHR MAC CE for the triggered PHR.

10. A wireless device configured to operate in a wireless communication system, the wireless device comprising:
    at least one radio frequency (RF) unit;
    at least one processor; and
    at least one computer memory operably connectable to the at least one processor, and storing instructions that, when executed by the at least one processor, perform operations comprising:
    receiving, through the at least one RF unit, power headroom report (PHR) configuration information;
    triggering a PHR based on the received PHR configuration information;
    transmitting, through the at least one RF unit, a PHR media access control (MAC) control element (CE) for the triggered PHR based on (i) at least one triggered PHR not having been cancelled, and (ii) allocated uplink (UL) resources able to accommodate the PHR MAC CE plus its subheader; and
    based on a determination to transmit the PHR MAC CE for the triggered PHR, canceling all triggered PHRs,
    wherein the PHR configuration information is received from a network in a handover command.

11. The wireless device of claim 10, wherein the PHR MAC CE includes (i) an R field which is a reserved bit, and (ii) a power headroom field informing a power headroom level for the wireless device.

12. The wireless device of claim 10, wherein the PHR MAC CE includes an extended PHR MAC CE.

13. The wireless device of claim 10, wherein the PHR is triggered by reconfiguring the PHR configuration information.

14. The wireless device of claim 10, wherein receiving the PHR configuration information comprises:
    receiving information regarding (i) a PHR-prohibit timer, and (ii) a threshold pathloss change.

15. The wireless device of claim 14, wherein triggering the PHR based on the received PHR configuration information comprises:
    triggering the PHR based on (i) an expiration of the PHR-prohibit timer, and (ii) a change in downlink pathloss value by more than the threshold pathloss change.

16. The wireless device of claim 15, wherein the operations further comprise:
    starting or restarting the PHR-prohibit timer based on the determination to transmit the PHR MAC CE for the triggered PHR.

17. The wireless device of claim 14, wherein receiving the PHR configuration information further comprises receiving information regarding a PHR-periodic timer, and
    wherein the operations further comprise:
    starting the PHR-periodic timer based on triggering the PHR.

18. The wireless device of claim 17, wherein the operations further comprise:
    starting or restarting both the PHR-prohibit timer and the PHR-periodic timer based on the determination to transmit the PHR MAC CE for the triggered PHR.

* * * * *